March 10, 1925.　　　　　　　　　　　　　　　　　　　1,528,883
G. B. LINDQUIST
HOLDER FOR TREES AND THE LIKE
Filed Aug. 25, 1924
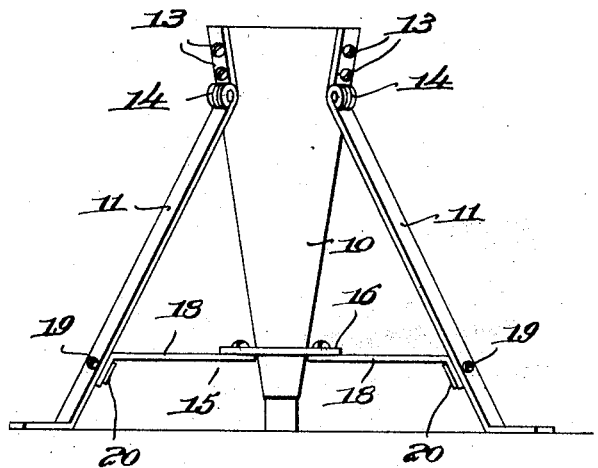
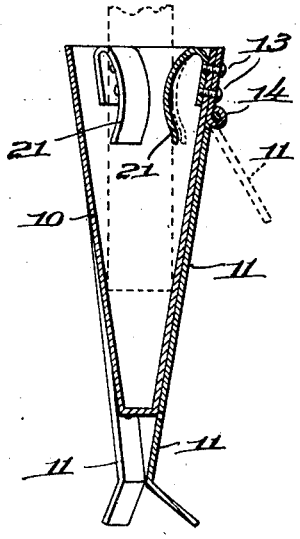
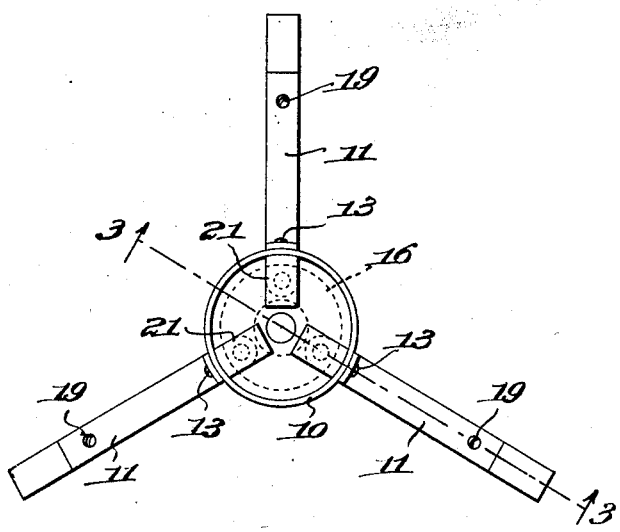
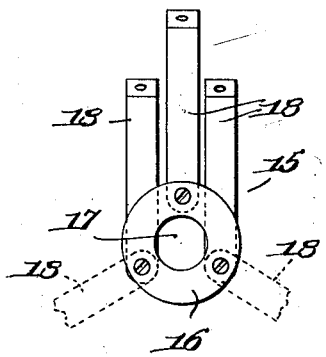

Patented Mar. 10, 1925.

1,528,883

UNITED STATES PATENT OFFICE.

GUSTAV B. LINDQUIST, OF SOUTH BRAINTREE, MASSACHUSETTS.

HOLDER FOR TREES AND THE LIKE.

Application filed August 25, 1924. Serial No. 733,985.

*To all whom it may concern:*

Be it known that I, GUSTAV B. LINDQUIST, a subject of the King of Sweden, and a resident of South Braintree, in the county of Norfolk and Commonwealth of Massachusetts, have invented certain new and useful Improvements in Holders for Trees and the like, of which the following is a specification.

This invention relates to holders for Christmas trees and the like.

It is an object of the invention to produce a holder that is substantial, and fully equal to the work expected of it, and yet one that may be produced at a cost that makes it attractive to the trade.

It is a further object of the invention to produce a simple and inexpensive holder that may be knocked down for the purpose of storage or shipping, and which consists of but two main parts easily detached one from the other, and each of which is adapted to be collapsed so that the whole may be made to occupy comparatively little space.

Another object of the invention is to produce a tree holder of such simple structure that it may be erected and knocked down by an inexperienced person, and which has a tree supporting member capable of holding a quantity of water upon which a tree may feed to thereby prolong its life.

To the attainment of the above objects, the invention consists in certain features of construction and arrangement of parts which will be fully understood from a description of the drawings and the claims hereinafter given.

Of the drawings:

Figure 1 represents the improved tree holder in side elevation.

Figure 2 is a top plan view of the holder as seen in Figure 1.

Figure 3 is a section on the line 3—3 Figure 2 showing a portion of the holder as it would appear when collapsed.

Figure 4 is a view of the brace shown in Figures 1 and 3 as it would appear when detached from the holder and collapsed for storing or shipping.

Like characters represent like parts throughout the several figures of the drawings.

Referring to the drawings:

The present invention is an improvement on an application filed March 6, 1923, Serial Number 623,107, and has a tree trunk receiving cone 10, legs 11, and spiderlike brace 15.

The cone 10 as in the previous application is preferably made of sheet metal and capable of holding water, and in the present instance the legs 11 are secured to it by means of screws or other suitable means 13.

Instead of making the legs 11 removable from the cone 10 to economize in space for shipping, the said legs are jointed as at 14 so that they may be folded close to the body of the cone 10 as seen in Figure 3 of the drawings.

The spiderlike brace 15 is in this instance composed of a disk 16 having a central hole 17 to be entered by the reduced end of the cone, and pivotally arranged arms 18 adapted to be secured to the legs 11 by stove bolts and nuts 19 and 20 respectively, or by other suitable means.

Springs 21 are arranged internally of the cone 10 and are preferably secured thereto by the same means that secures the legs 11.

As in the above application these springs function as resilient trunk centering means in conjunction with the cone 10 against which the approximately round butt of the trunk rests as seen in dotted lines Figure 3.

To knock down the holder the bolts 19 will be released and the brace 12 separated from the cone after which two of the arms 18 will be swung on their pivots to assume the positions shown in Figure 4, and the legs 11 will be swung on the joints 14 to occupy the positions shown in Figure 3.

It will thus be seen that the holder may be quickly made to occupy but small space for the purpose of storing or shipping, and by an inexperienced person.

Having described the invention I claim:

In a tree holder of the class described, a conical receptacle adapted to receive tree trunks of various sizes; a plurality of hinged legs fast to said receptacle and normally arranged conically with respect to the axis thereof but capable of being folded closely to the body thereof at certain times; and a brace member comprising a disk having a hole therein for the reception of said receptacle and arms pivotally secured thereto and detachably secured to said legs.

Signed by me at Boston, Massachusetts, this 22nd day of August, 1924.

GUSTAV B. LINDQUIST